US010762610B2

(12) United States Patent
Li et al.

(10) Patent No.: US 10,762,610 B2
(45) Date of Patent: Sep. 1, 2020

(54) METHOD FOR DETERMINING FILTER COEFFICIENTS

(71) Applicant: REALTEK SEMICONDUCTOR CORPORATION, Hsinchu (TW)

(72) Inventors: Tsung-Hsuan Li, Taichung (TW); Wan-Ju Tang, Hsinchu (TW); Yang-Ting Chou, Tainan (TW); Shih-Tse Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 45 days.

(21) Appl. No.: 16/363,472

(22) Filed: Mar. 25, 2019

(65) Prior Publication Data

US 2020/0043152 A1 Feb. 6, 2020

(30) Foreign Application Priority Data

Aug. 2, 2018 (TW) ............................ 107126784 A

(51) Int. Cl.
*G06T 5/20* (2006.01)

(52) U.S. Cl.
CPC .................................... *G06T 5/20* (2013.01)

(58) Field of Classification Search
CPC .... G06T 5/20; G06T 5/00; G06T 3/40; G06T 3/4007; G06T 3/4015; G06T 3/4038; G06T 7/44; G06T 5/005; G06T 2207/20008; G06T 2207/20024; G06T 2207/20172; G06K 9/00; H04N 9/0455; H04N 9/3114;

(Continued)

(56) References Cited

U.S. PATENT DOCUMENTS

| | | | | |
|---|---|---|---|---|
| 6,188,803 B1 * | 2/2001 | Iwase | .................... G06T 3/4007 358/1.9 |
| 6,256,068 B1 * | 7/2001 | Takada | ................. G06T 3/4007 345/603 |
| 6,631,206 B1 | 10/2003 | Cheng et al. | |

(Continued)

OTHER PUBLICATIONS

Lin, Xuan-Tien, "Machine Learning Foundations", handout for lecture, Department of Computer Science & Information Engineering, National Taiwan University (source: p. No. 21/27, "https://www.csie.ntu.edu.tw/~htlin/mooc/doc/01_handout.pdf".

(Continued)

*Primary Examiner* — Manav Seth
(74) *Attorney, Agent, or Firm* — WPAT, PC

(57) ABSTRACT

Disclosed is a method for determining filter coefficients. The method includes: obtaining the coefficients of a target filter and calculating the response of the target filter; computing according to collected data and/or predetermined data in accordance with a first data pattern so as to have the response of a first filter approximate to the response of the target filter and thereby determine the coefficients of the first filter; and computing according to the collected data and/or the predetermined data in accordance with a second data pattern so as to have the response of a second filter approximate to the response of the target filter and thereby determine the coefficients of the second filter. Accordingly, the difference between the responses of the first filter and the second filter is insignificant and results in less negative influence; and the first and the second filters can replace the target filter to reduce cost.

12 Claims, 6 Drawing Sheets

| | | | | | |
|---|---|---|---|---|---|
| $R_{11}$ | $R_{12}$ | $R_{13}$ | $R_{14}$ | $R_{15}$ | $R_{16}$ |
| $R_{21}$ | $R_{22}$ | $R_{23}$ | $R_{24}$ | $R_{25}$ | $R_{26}$ |
| $R_{31}$ | $R_{32}$ | $R_{33}$ | $R_{34}$ | $R_{35}$ | $R_{36}$ |
| $R_{41}$ | $R_{42}$ | $R_{43}$ | $R_{44}$ | $R_{45}$ | $R_{46}$ |
| $R_{51}$ | $R_{52}$ | $R_{53}$ | $R_{54}$ | $R_{55}$ | $R_{56}$ |
| $R_{61}$ | $R_{62}$ | $R_{63}$ | $R_{64}$ | $R_{65}$ | $R_{66}$ |

(58) Field of Classification Search
CPC .... H04N 9/3117; H04N 9/646; H04N 19/117; H04N 21/23418
See application file for complete search history.

(56) References Cited

U.S. PATENT DOCUMENTS

| | | | | |
|---|---|---|---|---|
| 6,970,597 | B1 * | 11/2005 | Olding | G06T 3/4015 348/273 |
| 7,050,649 | B2 * | 5/2006 | Slavin | G06T 3/4023 382/275 |
| 7,305,141 | B2 * | 12/2007 | Jaspers | G06T 5/20 348/E9.01 |
| 7,319,496 | B2 * | 1/2008 | Uchida | H04N 5/142 348/625 |
| 7,373,020 | B2 * | 5/2008 | Tsukioka | G06T 3/4015 348/E9.01 |
| 8,525,895 | B2 * | 9/2013 | Cote | G06T 3/4015 348/222.1 |
| 8,630,507 | B2 * | 1/2014 | De Haan | G06T 5/20 358/463 |
| 8,817,120 | B2 * | 8/2014 | Silverstein | G06T 5/005 348/208.14 |
| 9,118,933 | B1 * | 8/2015 | Alshin | H04N 19/86 |
| 9,177,370 | B2 * | 11/2015 | Chen | G06T 5/20 |
| 9,466,282 | B2 * | 10/2016 | Park | G10K 11/178 |
| 10,034,008 | B2 * | 7/2018 | Alshina | H04N 19/503 |
| 10,083,512 | B2 * | 9/2018 | Tateno | G06K 9/4609 |
| 2009/0087119 | A1 * | 4/2009 | Dorrell | G06T 3/4007 382/264 |
| 2010/0155587 | A1 * | 6/2010 | Nikittin | H04N 5/3655 250/252.1 |

OTHER PUBLICATIONS

L. Vandenberghe, "Constrained least squares", p. Nos. 11-14-11-15, ECE133A (Winter 2018)(source: http://www.seas.ucla.edu/~vandenbe/133A/lectures/cls.pdf).

"Lecture 3 Positive Semidefinite Matrices", Theorem 2 (source: http://www.math.ucsd.edu/~njw/Teaching/Math271C/Lecture_03.pdf).

Zico Kolter, "Linear Algebra Review and Reference", section 3.13, Sep. 30, 2015 (source: http://cs229.stanford.edu/section/cs229-linalg.pdf).

Wojciech Jarosz, "Computational Aspects of Digital Photography—Sensors & Demosaicing", CS 89.15/189.5, Fall 2015.

Wikipedia "Discrete cosine transform", Wikipedia (source: https://en.wikipedia.org/wiki/Discrete_cosine_transform#Applications).

"Karhunen-Loeve Transform" (source: http://fourier.eng.hmc.edu/e161/lectures/klt/node3.html).

"Mahalanobis distance" (source: http://slideplayer.com/slide/5139522/16/images/8/Mahalanobis+Distance+%EF%81%93+is+the+covariance+matrix+of+the+input+data+X.jpg).

Wikipedia "Positive-definite matrix", Wikipedia (source: https://en.wikipedia.org/wiki/Positive-definite_matrix).

I-Chen Lin, "Computer Vision: 8. Camera Models (b)", Dept. of CS, National Chiao Tung University.

OA letter of the counterpart TW application (appl. No. 107126784) mailed on Mar. 29, 2019. Summary of the TW OA letter: Claims 1, 7-9 are rejected as being anticipated by the cited reference 1 (U.S. Pat. No. 6,631,206 B1).

* cited by examiner

| G | R | G | R | G | R |
|---|---|---|---|---|---|
| B | G | B | G | B | G |
| G | R | G | R | G | R |
| B | G | B | G | B | G |
| G | R | G | R | G | R |
| B | G | B | G | B | G |

Fig. 1（Prior Art）

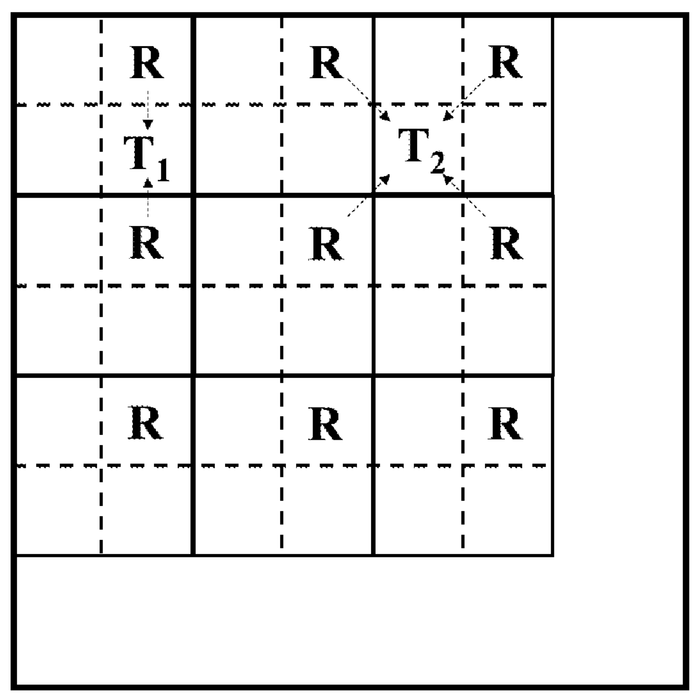
Fig. 2（Prior Art）

Figure 5:
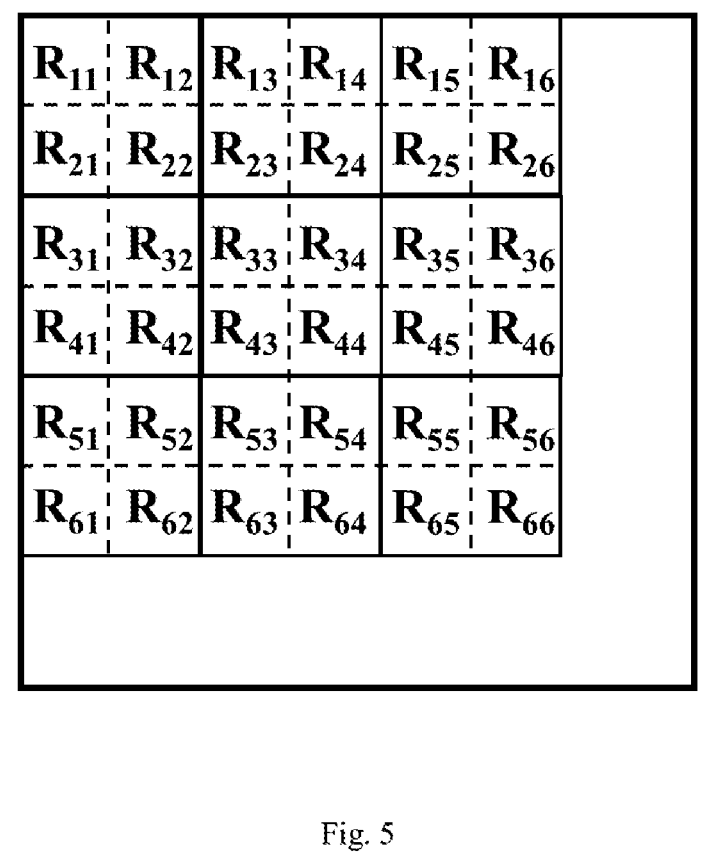

METHOD FOR DETERMINING FILTER COEFFICIENTS

BACKGROUND OF THE INVENTION

1. Field of the Invention

The present invention relates to the design of a filter, especially to a method for determining the coefficients of a filter.

2. Description of Related Art

A filter is usually used for signal processing. In consideration of the cost, the design of a filter aims at decreasing the number of signals to be processed by the filter so as to reduce the complexity of calculation, or a front-end circuit lowers the sampling rate for signals so as to decrease the amount of data inputted into a filter. For instance, a color filter array (CFA) of an image sensor allows each pixel sensing position of a photosensitive component of the image sensor to record the intensity of a certain color so as to reduce the production cost; however, since each pixel sensing position only records the information of one color, the other color information of the same pixel sensing position is lost and needs to be recovered by a filter according to the color information recorded by the neighboring pixel sensing positions; more specifically, when a target pixel sensing position associated with a target pixel only records green color information, the filter executes interpolation according to the red color information recorded by the pixel sensing positions close to the target pixel sensing position to generate the red color information of the target pixel, and executes interpolation according to the blue color information recorded by the pixel sensing positions close to the target pixel sensing position to generate the blue color information of the target pixel.

Please refer to FIGS. 1-3. FIG. 1 shows an exemplary image pixel array of a photosensitive component recording red color information (R), green color information (G), and blue color information (B); FIG. 2 shows the red color information recorded by the image pixel array; and FIG. 3 shows the blue color information recorded by the image pixel array. FIGS. 1-3 merely shows partial information in order to prevent these figures from being too complicated. As shown in FIG. 2/FIG. 3, two kinds of filters are used to recover the red/blue color information of the pixel $T_1/T_3$ and the pixel $T_2/T_4$ respectively; more specifically, one filter executes interpolation according to the red/blue color information of the pixel above the pixel $T_1/T_3$ and the pixel below the pixel $T_1/T_3$ and thereby generates the red/blue color information of the pixel $T_1/T_3$, and the other one executes interpolation according to the red/blue color information of the pixels located at the upper left, the upper right, the bottom left, and the bottom right in relation to the position of the pixel $T_2/T_4$ and thereby generates the red/blue color information of the pixel $T_2/T_4$. In the current arts, the filter responses of the two kinds of filters are usually different, which often leads to image distortion (e.g., zipper effect).

SUMMARY OF THE INVENTION

An object of the present invention is to provide a method for determining the coefficients of a filter so as to make an improvement over the prior art.

An embodiment of the method of the present invention includes the following steps: obtaining coefficients of a target filter and thereby calculating a target filter response, in which the target filter response relates to a way of the target filter to process original data; computing according to collected data and/or predetermined data in accordance with a first data pattern so as to have a difference between a first filter response and the target filter response be less than a threshold and thereby determine coefficients of a first filter, in which the first filter response relates to a way of the first filter to process first data originated from the original data; and computing according to the collected data and/or the predetermined data in accordance with a second data pattern so as to have a difference between a second filter response and the target filter response be less than the threshold and thereby determine coefficients of a second filter, in which the second filter response relates to a way of the second filter to process second data originated from the original data. In light of the above, both the first filter response and the second filter response approximate to the target filter response so that the negative influence caused by the difference between the first filter response and the second filter response is reduced.

Another embodiment of the method of the present invention includes the following steps: obtaining coefficients of a target filter and thereby calculating a target filter response, in which the target filter response relates to a way of the target filter to process original data; and computing according to collected data and/or predetermined data in accordance with the type (e.g., the pattern for filtering signals) of a front-end filter and thereby having a difference between a designed filter response and the target filter response be less than a threshold so as to determine coefficients of a designed filter, in which the designed filter response relates to a way of the designed filter to process filtered data originated from the front-end filter processing the original data. In light of the above, the designed filter response approximates to the target filter response and the designed filter is simpler than the target filter so that the design filter can replace the target filter to reduce the production cost.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 1 shows an exemplary image pixel array recording color information.

FIG. 2 shows the red color information recorded by the image pixel array of FIG. 1 and the way to use the red color information for interpolation.

FIG. 5 shows red color signals captured by an image sensor without being processed by a color filter array.

DETAILED DESCRIPTION OF THE PREFERRED EMBODIMENTS

As modern data science and machine learning develop, an eye-catching theory refers to the approximation to the regularity of data relationship with a trainable computation model. The method of the present invention for determining the coefficients of a filter is based on the research achievement of the above-mentioned theory. This theory can be found in the following literature: professor LIN, XUAN-TIAN, "Machine Learning Foundations", handout for lecture, Department of Computer Science & Information Engineering, National Taiwan University (source of literature: page number 21/27, "https://www.csie.ntu.edu.tw/~htlin/mooc/doc/01_handout.pdf").

Figure 3:
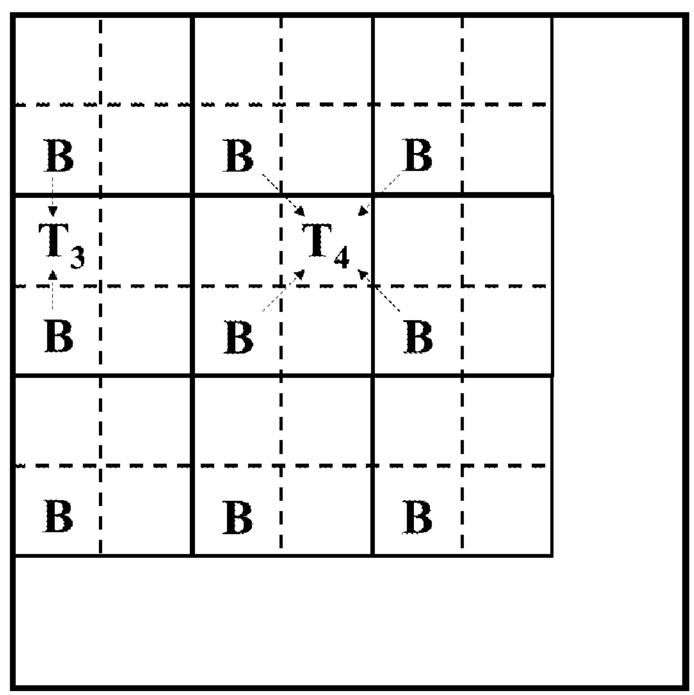
FIG. 3 shows the blue color information recorded by the image pixel array of FIG. 1 and the way to use the blue color information for interpolation.
Figure 4:
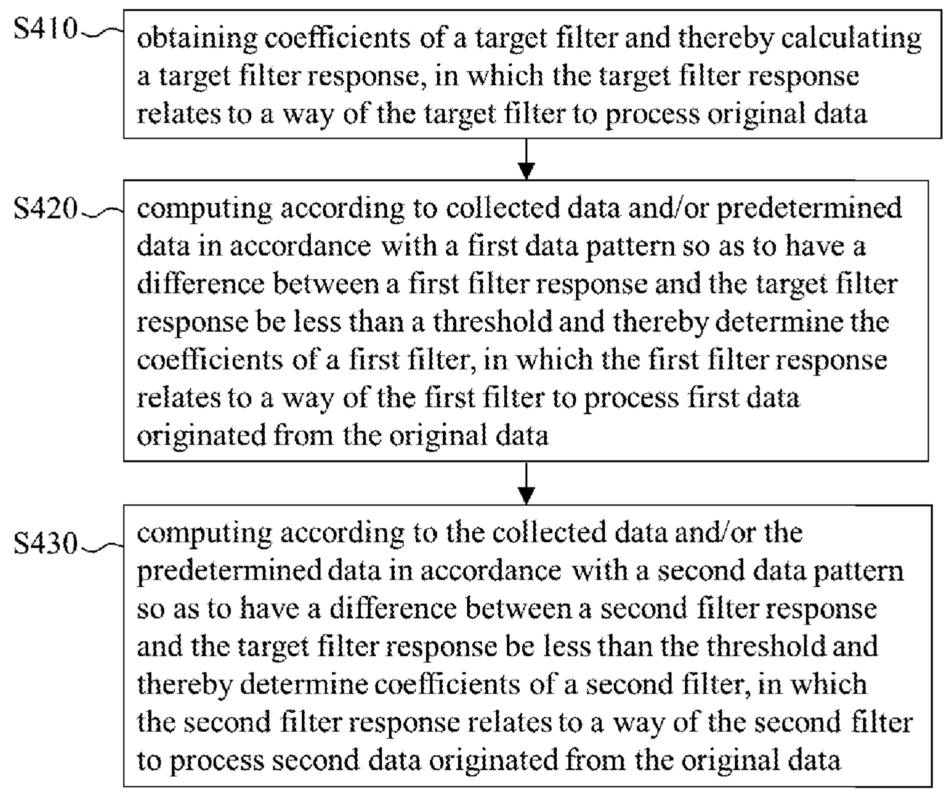
FIG. 4 shows an embodiment of the method of the present invention for determining the coefficients of a filter.

FIG. 4 shows an embodiment of the method of the present invention for determining the coefficients of a filter. This embodiment can be carried out by a general-purpose computer or a dedicated device, and includes the following steps:

Step S410: obtaining coefficients of a target filter and thereby calculating a target filter response, in which the target filter response relates to a way of the target filter to process original data. The way of the target filter to process the original data can be understood as the pattern of the target filter for filtering the original data. In an exemplary implementation, the original data relates to signals of a specific color (e.g., red) generated by an image sensor without using a color filter array (CFA) circuit; for instance, the signals are the red information data of nine pixels $$\begin{bmatrix} R_{11} & R_{12} & R_{13} \\ R_{21} & R_{22} & R_{23} \\ R_{31} & R_{32} & R_{33} \end{bmatrix}$$

centered at the position of the pixel $R_{22}$ in FIG. 5, and one can notice that the position of the pixel $R_{22}$ is corresponding to the position of the pixel $T_1$ in FIG. 2. In order to make the explanation simple for better understanding, provided the original data include a one-dimensional image matrix $q^T=[R_0\ R_1\ R_2\ R_3\ R_4\ R_5\ R_6\ R_7\ R_8]$ and the coefficients of the target filter are $f^T=[f_0\ f_1\ f_2\ f_3\ f_4\ f_5\ f_6\ f_7\ f_8]$, the target filter response can be expressed as $f^Tq$, in which the superscript "T" stands for the transposition of the matrix. It should be noted that the original data may include other data such as signals of other colors (e.g., green and blue) generated by the same image sensor without using the CFA circuit.

Step S420: computing according to collected data and/or predetermined data (e.g., given data such as the below-mentioned diagonal matrix and orthonormal basis $b_0, \ldots, b_{m-1}$) in accordance with a first data pattern (e.g., the distribution pattern $$\begin{bmatrix} G_{11} & R_{12} & G_{13} \\ B_{21} & G_{22} & B_{23} \\ G_{31} & R_{32} & G_{33} \end{bmatrix}$$

of pixels that are taken into consideration by a filter for generating the red information of the pixel $T_1$ of FIG. 2, in which $G_{22}$ is associated with the position of the pixel $T_1$ of FIG. 2 while the others are associated with the positions of the eight pixels around $T_1$ respectively) so as to have a difference between a first filter response and the target filter response be less than a threshold and thereby determine the coefficients of a first filter, in which the first filter response relates to a way of the first filter to process first data (e.g., the data generated by the aforementioned CFA circuit processing the original data, such as the data of the nine pixels centered at the position of the pixel $T_1$ of FIG. 2) originated from the original data and the threshold can be determined according to the demand for implementation. In an exemplary implementation, if the collected data include a one-dimensional image array $p^T=[G_0\ R_1\ G_2\ R_3\ G_4\ R_5\ G_6\ R_7\ G_8]$ (e.g., the values of the nine pixels of the first row of the array in FIG. 1) and the coefficients of the first filter are $g^T=[g_0\ g_1\ g_2\ g_3\ g_4\ g_5\ g_6\ g_7\ g_8]$, the first filter response $g^Tp$ should approximate to the target filter response $f^Tq$ (i.e., $g^T \approx f^Tq$), and the effect of the coefficients $g^T$ of the first filter on data of the color except red (i.e., $G_0$, $G_2$, $G_4$, $G_6$, $G_8$) should be zero/negligible and can be expressed with the following equations:

$$Cg = \begin{bmatrix} 1 & 0 & 0 & 0 & 0 & 0 & 0 & 0 & 0 \\ 0 & 0 & 1 & 0 & 0 & 0 & 0 & 0 & 0 \\ 0 & 0 & 0 & 0 & 1 & 0 & 0 & 0 & 0 \\ 0 & 0 & 0 & 0 & 0 & 0 & 1 & 0 & 0 \\ 0 & 0 & 0 & 0 & 0 & 0 & 0 & 0 & 1 \end{bmatrix} \begin{bmatrix} g_0 \\ \vdots \\ g_8 \end{bmatrix} = \begin{bmatrix} g_0 \\ g_2 \\ g_4 \\ g_6 \\ g_8 \end{bmatrix} = \begin{bmatrix} 0 \\ 0 \\ 0 \\ 0 \\ 0 \end{bmatrix} = d$$

(the above equation is suitable for the target filter being any kind of filters)

$$Cg = \begin{bmatrix} 1 & 0 & 0 & 0 & 0 & 0 & 0 & 0 & 0 \\ 0 & 0 & 1 & 0 & 0 & 0 & 0 & 0 & 0 \\ 0 & 0 & 0 & 0 & 1 & 0 & 0 & 0 & 0 \\ 0 & 0 & 0 & 0 & 0 & 0 & 1 & 0 & 0 \\ 0 & 0 & 0 & 0 & 0 & 0 & 0 & 0 & 1 \\ 1 & 1 & 1 & 1 & 1 & 1 & 1 & 1 & 1 \end{bmatrix} \begin{bmatrix} g_0 \\ \vdots \\ g_8 \end{bmatrix} = \begin{bmatrix} g_0 \\ g_2 \\ g_4 \\ g_6 \\ g_8 \\ g_0 + g_2 + \ldots + g_8 \end{bmatrix} = \begin{bmatrix} 0 \\ 0 \\ 0 \\ 0 \\ 0 \\ 1 \end{bmatrix} = d$$

(the above equation is suitable for the target filter being a low pass filter)

$$Cg = \begin{bmatrix} 1 & 0 & 0 & 0 & 0 & 0 & 0 & 0 & 0 \\ 0 & 0 & 1 & 0 & 0 & 0 & 0 & 0 & 0 \\ 0 & 0 & 0 & 0 & 1 & 0 & 0 & 0 & 0 \\ 0 & 0 & 0 & 0 & 0 & 0 & 1 & 0 & 0 \\ 0 & 0 & 0 & 0 & 0 & 0 & 0 & 0 & 1 \\ 1 & 1 & 1 & 1 & 1 & 1 & 1 & 1 & 1 \end{bmatrix} \begin{bmatrix} g_0 \\ \vdots \\ g_8 \end{bmatrix} = \begin{bmatrix} g_0 \\ g_2 \\ g_4 \\ g_6 \\ g_8 \\ g_0 + g_2 + \ldots + g_8 \end{bmatrix} = \begin{bmatrix} 0 \\ 0 \\ 0 \\ 0 \\ 0 \\ 0 \end{bmatrix} = d$$

(the above equation is suitable for the target filter being a high pass filter)

Figure 6:
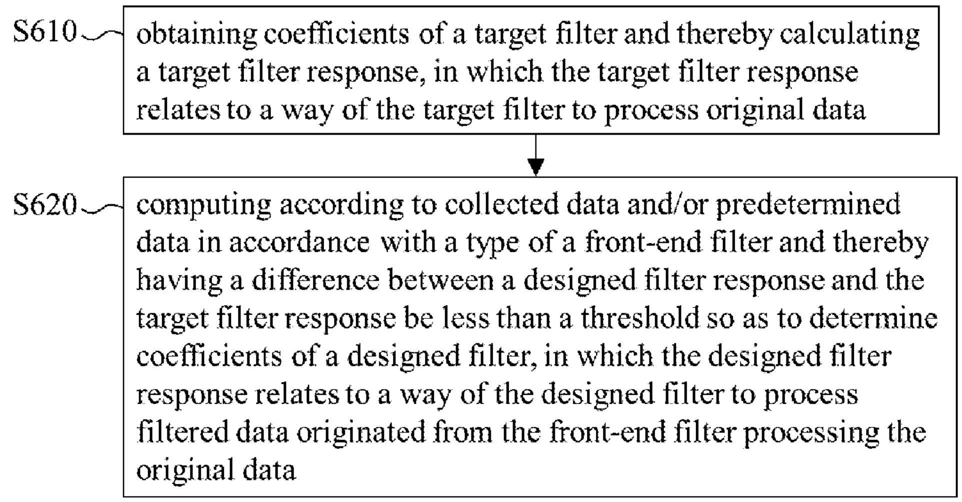
FIG. 6 shows another embodiment of the method of the present invention for determining the coefficients of a filter.

Accordingly, Step S420 is used for calculating the coefficients $g^T$ of the first filter when the difference between $g^Tp$ and $f^Tq$ is minimum or the difference achieves (e.g., is equal to or less than) the aforementioned threshold. It should be noted that in the above equations, the matrix "C" and the matrix "d" are determined according to a data pattern (i.e., the pattern of data to be filtered) (while the matrix "C" and the matrix "d" in the embodiment of FIG. 6 are determined according to the type of a front-end filter); more specifically, a different data pattern results in a different matrix "C" and a different matrix "d" so as to have the effect of the filter coefficients on the data of a non-targeted color be zero/negligible. It should also be noted that when the collected data are obtained by sampling a lot of various data, the collected data may adequately reflect the regularity of the complete data and the difference between $g^Tp$ and $f^Tq$ may be minimized. In another exemplary implementation, regarding a 5×5 RGB pixel matrix obtained without using a CFA circuit, the whole RGB image data "q" (including twenty-five red pixel data $R_0$~$R_{24}$, twenty-five green pixel data $G_0$~$G_{24}$, and twenty-five blue pixel data $B_0$~$B_{24}$) can be expressed as follows:

$$q^T=[q_0 q_1 \ldots q_{74}]=[R_0 \ldots R_{24} G_0 \ldots G_{24} B_0 \ldots B_{24}]$$

After the whole RGB image data pass through a CFA array, if the central pixel of the RGB pixel matrix is the target pixel and the red information data $R_{12}$ of the target pixel is what we want, the coefficients of the target filter "f "can be expressed as follows:

$$f^T = [f_0\ f_1\ \ldots\ \ldots\ f_{74}],\ f_i = \begin{cases} 1 & \text{if } i = 12 \\ 0 & \text{otherwise} \end{cases}\ 0 \le i \le 74$$

In addition, the coefficients "g" of the first filter should fulfill the followings requirements (which can be expressed in the form of Cg=d):

$$\forall k \notin \Omega_R g_k = 0 \quad 1.$$

$$\forall k \notin \Omega_G g_{25+k} = 0 \quad 2.$$

$$\forall k \notin \Omega_B g_{50+k} = 0 \quad 3.$$

$$\Sigma_{k \in \Omega_R} g_k = 1 \quad 4.$$

$$\Sigma_{k \in \Omega_G} g_{25+k} = 0 \quad 5.$$

$$\Sigma_{k \in \Omega_B} g_{50+k} = 0 \quad 6.$$

The definition of $\Omega_C$ in the above conditions is shown below:

$$\Omega_C=\{k|0 \le k \le 24 \wedge \text{pixel } k \text{ is pixel of } C \text{ channel}\},\ C \in \{R,G,B\}$$

$\Omega_C$ stands for the indexes respectively associated with R, G, B channels in the 5×5 matrix obtained with the CFA circuit. The aforementioned requirements 1~3 are basic requirements for achieving the purpose of filtering C channel without referring to the pixels of the other channels; the effects of the requirements 4~6 are equivalent to a low pass filter "LPF" acquiring twenty-five values, a high pass filter "$HPF_0$" acquiring twenty-five values, and a high pass filter "$HPF_1$" acquiring twenty-five values respectively while "LPF", "$HPF_0$", and "$HPF_1$" can be expressed as follows:

$$LPF=[g_0 \ldots g_{24}]$$

$$HPF_0=[g_{25} \ldots g_{49}]$$

$$HPF_1=[g_{50} \ldots g_{74}]$$

Additionally, the following equation should be sustained:

$$g^T q = LPF(R) + HPF_0(G) + HPF_1(B) \approx APF(R)$$

In the above equation, "APF" stands for an all pass filter, and "APF(R)" stands for the whole data of R channel without being filtered by a CFA circuit.

Step S430: computing according to the collected data and/or the predetermined data in accordance with a second data pattern (e.g., the distribution pattern $$\begin{bmatrix} R_{14} & G_{15} & R_{16} \\ G_{24} & B_{25} & G_{26} \\ R_{34} & G_{35} & R_{36} \end{bmatrix}$$

of pixels that are taken into consideration by a filter for generating the red information of the pixel $T_2$ of FIG. 2, in which $B_{25}$ is associated with the position of the pixel $T_2$ of FIG. 2 while the others are associated with the positions of the eight pixels around $T_2$ respectively) so as to have a difference between a second filter response and the target filter response be less than the threshold and thereby determine coefficients of a second filter, in which the second filter response relates to a way of the second filter to process second data (e.g., the data generated by the aforementioned CFA circuit processing the original data, such as the data of the nine pixels centered at the position of the pixel $T_2$ of FIG. 2) originated from the original data. Accordingly, both the first filter response and the second filter response approximate to the target filter response and thus the first filter response and the second filter response are similar so that the negative influence (e.g., image distortion) caused by the different filter responses exerted on the data originated from the same source can be prevented. Since step S430 is similar to step S420 and the difference between the two steps is the difference between the data patterns to which the two steps refer, those of ordinary skill in the art can appreciate the detail and the modification of step S430 with the detail description of step S420.

An exemplary implementation of calculating the difference between $g^T p$ and $f^T q$ is described below. First, the difference between $g^T p$ and $f^T q$ can be quantized in the form of square error and then optimized as shown below:

$$\text{Minimize}(g^T q - f^T q)^2$$

In the above equation, "Minimize" stands for finding the value of "g" making the result of the equation (i.e., the value of $(g^T q - f^T q)^2$) minimum. The aforementioned collected data can be expressed as follows:

$$Q=\{q_i|0 \le i < n\}$$

In the above equation, "Q" stands for the collected data, "n" stands for the number (e.g., positive integer) of records of data, and each record of data could be a data group such as the aforementioned pixel array $q^T=[R_0\ R_1\ R_2\ R_3\ R_4\ R_5\ R_6\ R_7\ R_8]$. Therefore, the way to find out the coefficients $g^T$ of the first filter according to the collected data "Q" can be understood as finding the result of the following equation:

$$\text{Minimize } \frac{1}{n} \cdot \left\| \begin{bmatrix} q_0^T \\ \vdots \\ q_{n-1}^T \end{bmatrix} g - \begin{bmatrix} q_0^T \\ \vdots \\ q_{n-1}^T \end{bmatrix} f \right\|^2 \text{ subject to } Cg = d$$

In the above equation, "subject to Cg=d" stands for the execution of the Minimize operation under the condition of Cg=d; the description of the matrix "C" and the matrix "d" is found in the preceding paragraph. The way to derive the result of the above equation is found in the following literature: "L. Vandenberghe, "Constrained least squares", page numbers 11-14~11-15, ECE133A (Winter 2018)" (source of literature: http://www.seas.ucla.edu/~vandenbe/133A/lectures/cls.pdf). The aforementioned error term $$\frac{1}{n}\cdot\left\|\begin{bmatrix} q_0^T \\ \vdots \\ q_{n-1}^T \end{bmatrix} g - \begin{bmatrix} q_0^T \\ \vdots \\ q_{n-1}^T \end{bmatrix} f\right\|^2$$

can be rewritten as follows:

$$\frac{1}{n}\cdot\left(\begin{bmatrix} q_0^T \\ \vdots \\ q_{n-1}^T \end{bmatrix} g - \begin{bmatrix} q_0^T \\ \vdots \\ q_{n-1}^T \end{bmatrix} f\right)^T\left(\begin{bmatrix} q_0^T \\ \vdots \\ q_{n-1}^T \end{bmatrix} g - \begin{bmatrix} q_0^T \\ \vdots \\ q_{n-1}^T \end{bmatrix} f\right) = (g^T - f^T)M(g - f)$$

The matrix M of the above equation is shown below:

$$M = \frac{1}{n}\cdot[q_0 \ \dots \ q_{n-1}]\begin{bmatrix} q_0^T \\ \vdots \\ q_{n-1}^T \end{bmatrix} = \frac{1}{n}\cdot\sum_{k=0}^{n-1} q_k\cdot q_k^T = E[qq^T]$$

In the above equation, "$E[qq^T]$" stands for the expected value of "$qq^T$" and is dependent on the statistic characteristic of the collected data "Q" while the size of the matrix "M" is merely related to the dimension "m" of the data "q" (e.g., m=9, if $q^T=[R_0\ R_1\ R_2\ R_3\ R_4\ R_5\ R_6\ R_7\ R_8]$) and unrelated to the aforementioned number "n" of records of data; accordingly, the process of minimizing the filter coefficients does not consume a lot of storage space. In addition, the matrix "M" is a symmetric positive semidefinite matrix and thus the mathematic technique "Eigen Decomposition" can be used to process the matrix "M" as shown below:

$$M = [e_0 \ \dots \ e_{m-1}]\begin{bmatrix} \lambda_0 & 0 & \dots & 0 \\ 0 & \lambda_1 & \ddots & \vdots \\ \vdots & \ddots & \ddots & 0 \\ 0 & \dots & 0 & \lambda_{m-1} \end{bmatrix}\begin{bmatrix} e_0^T \\ \vdots \\ e_{m-1}^T \end{bmatrix}$$

In the above equation, $e_0, \dots, e_{m-1} \in \mathbb{R}^m$ (i.e., m-dimensional Euclidean_space, that is to say m-dimensional real number space) are eigen vectors and constitute an orthonormal basis whose eigen values are $\lambda_0 \geq \dots \geq \lambda_{m-1} \geq 0$. The theoretical foundation of doing Eigen Decomposition to a positive semidefinite matrix is found in the following literature: "Lecture 3 Positive Semidefinite Matrices", Theorem 2" (source of literature: http://www.math.ucsd.edu/~njw/Teaching/Math271C/Lecture_03.pdf); and Zico Kolter, "Linear Algebra Review and Reference", section 3.13, Sep. 30, 2015 (source of literature: http://cs229.stanford.edu/section/cs229-linalg.pdf). In light of the above, a matrix "S" can be obtained as follows:

$$S = \begin{bmatrix} \sqrt{\lambda_0} & 0 & \dots & 0 \\ 0 & \sqrt{\lambda_1} & \ddots & \vdots \\ \vdots & \ddots & \ddots & 0 \\ 0 & \dots & 0 & \sqrt{\lambda_{m-1}} \end{bmatrix}\begin{bmatrix} e_0^T \\ \vdots \\ e_{m-1}^T \end{bmatrix}$$

The matrix "S" holds true for the following equation:

$$m = S^T S$$

Consequently, the aforementioned error term can be expressed as follows:

$$\frac{1}{n}\cdot\left\|\begin{bmatrix} q_0^T \\ \vdots \\ q_{n-1}^T \end{bmatrix} g - \begin{bmatrix} q_0^T \\ \vdots \\ q_{n-1}^T \end{bmatrix} f\right\|^2 = (g^T - f^T)M(g - f) = (Sg - Sf)^T(Sg - Sf) = \|Sg - Sf\|^2$$

In light of the above, the equation of minimizing the difference between $g^Tp$ and $f^Tg$ (i.e., Minimize $(g^Tq-f^Tq)^2$) can be rewritten as follows:

$$\text{Minimize}\|Sg - Sf\|^2 \text{ subject to } Cg = d$$

In the above equation, the matrix "S" is originated from the known collected data "Q", the matrix "f" are the given coefficients of the target filter, and thereby the coefficients $g^T$ of the first filter can be derived therefrom. It should be noted that the way to calculate the coefficients of the aforementioned second filter is the same as the way to calculate the coefficients $g^T$ of the first filter. It should also be noted that other mathematic techniques suitable for calculating the difference between $g^Tp$ and $f^Tq$ are applicable to the present invention.

On the basis of the above, when the collected data "Q" is insufficient for obtaining an effective statistic result and a reliable matrix "S" cannot be obtained through machine learning, an implementor carrying out the present invention can refer to the existing image statistic information (e.g., statistic data related to the color change of a natural image) to determine a diagonal matrix, which is treated as the aforementioned predetermined data, as shown below:

$$\begin{bmatrix} \sqrt{w_0} & 0 & \dots & 0 \\ 0 & \sqrt{w_1} & \ddots & \vdots \\ \vdots & \ddots & \ddots & 0 \\ 0 & \dots & 0 & \sqrt{w_{m-1}} \end{bmatrix}$$

Then the implementor can determine an orthonormal basis $b_0, \dots, b_{m-1}$ of an $\mathbb{R}^m$ vector space, and thereby use the diagonal matrix and the orthonormal basis to simulate the matrix "S" and then determine the coefficients of a filter. In the above equation, a non-restrictive example of $w_i$ is $$e^{\left(-\frac{i^2}{2\sigma^2}\right)},$$

in which $0 \leq i \leq (m-1)$, m is the dimension of the aforementioned data "q", and σ is the standard deviation of data distribution. More specifically, taking one-dimensional image signals for example, a discrete cosine transform (DCT) basis $b_k^T$ can be obtained according to the signals and expressed as follows:

$$b_k^T \stackrel{def}{=}$$

-continued $$\begin{cases} \sqrt{\frac{1}{m}}\left[\cos\left(\frac{\pi}{m}\cdot\left(0+\frac{1}{2}\right)\cdot k\right) \ \ldots \ \cos\left(\frac{\pi}{m}\cdot\left(m-1+\frac{1}{2}\right)\cdot k\right)\right] & \text{if } k=0 \\ \sqrt{\frac{2}{m}}\left[\cos\left(\frac{\pi}{m}\cdot\left(0+\frac{1}{2}\right)\cdot k\right) \ \ldots \ \cos\left(\frac{\pi}{m}\cdot\left(m-1+\frac{1}{2}\right)\cdot k\right)\right] & \text{if } 0<k<m \end{cases}$$

(Reference: https://en.wikipedia.org/wiki/Discrete_cosine_transform#DCT-II)

In addition, based on the inherent smoothness characteristic of the natural image, which implies that the weight of high frequency components is relatively low, $w_i$ can be set as $$w_i = e^{\left(-\frac{i^2}{2\sigma^2}\right)}.$$

In an exemplary implementation, each of the aforementioned first data and second data include pixel data of a specific color. For instance, the pixel data of the specific color are pixel data of the red color or the pixel data of the blue color. In an exemplary implementation, the data amount of the first pixel data of the specific color is less than the data amount of all pixel data of the specific color of the original data, and the data amount of the second pixel data of the specific color is less than the data amount of all pixel data of the specific color of the original data; in other words, the first/second pixel data of the specific color are (or originate from) a part of all pixel data of the specific color of the original data. In an exemplary implementation, the first filter and the second filter are known filters except their filter coefficients. In an exemplary implementation, the first data do not include pixel data of the specific color of a target pixel, and therefore the first filter is configured to generate the pixel data of the specific color of the target pixel according to the first data by interpolation; the second data do not include pixel data of the specific color of another target pixel, and the second filter is configured to generate the pixel data of the specific color of the another target pixel according to the second data by interpolation.

FIG. 6 shows another embodiment of the method of the present invention for determining the coefficients of a filter. This embodiment can be carried out by a general-purpose computer or a dedicated device, and includes the following steps:

Step S610: obtaining coefficients of a target filter and thereby calculating a target filter response, in which the target filter response relates to a way of the target filter to process original data.

Step S620: computing according to collected data and/or predetermined data in accordance with a type of a front-end filter (e.g., a CFA circuit or a self-developed mask) and thereby having a difference between a designed filter response and the target filter response be less than a threshold so as to determine coefficients of a designed filter, in which the designed filter response relates to a way of the designed filter to process filtered data originated from the front-end filter processing the original data.

In light of the above, the embodiment of FIG. 6 has the filter response of a filter be similar to the filter response of a target filter. In comparison with the embodiment of FIG. 6, the embodiment of FIG. 4 has the filter responses of two filters be similar to the filter response of a target filter. Accordingly, the applicability of the embodiment of FIG. 6 is more flexible. In an exemplary implementation, the filtered data include the pixel data of a specific color, but the filtered data do not include the pixel data of the specific color of a target pixel; therefore, the designed filter is configured to generate the pixel data of the specific color of the target pixel according to the filtered data. In an exemplary implementation, the data amount of the pixel data of the specific color of the filtered data is less than the data amount of all pixel data of the specific color of the original data.

Since those of ordinary skill in the art can refer to the embodiment of FIG. 4 to appreciate the detail and the modification of the embodiment of FIG. 6, which implies that the techniques of the embodiment of FIG. 4 can be applied to the embodiment of FIG. 6 in a reasonable way, repeated and redundant description is omitted.

It should be noted that people of ordinary skill in the art can selectively use some or all of the features of any embodiment in this specification or selectively use some or all of the features of multiple embodiments in this specification to implement the present invention as long as such implementation is practicable, which implies that the present invention can be carried out flexibly.

To sum up, the present invention can adequately determine the coefficients of one or more filters and have the filter response(s) of the filter(s) be similar to the filter response of a target filter; accordingly, the present invention can not only reduce the negative influence caused by the different filter responses of different filters exerted on the same image data, but also replace the target filter with the filter(s) for the reduction of cost provided there are not much data to be processed by the filter(s).

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A method for determining filter coefficients, comprising:

obtaining coefficients of a target filter and thereby calculating a target filter response, in which the target filter response relates to a way of the target filter to process original data;

computing according to collected data and/or predetermined data in accordance with a first data pattern so as to have a difference between a first filter response and the target filter response be less than a threshold and thereby determine coefficients of a first filter, in which the first filter response relates to a way of the first filter to process first data originated from the original data; and computing according to the collected data and/or the predetermined data in accordance with a second data pattern so as to have a difference between a second filter response and the target filter response be less than the threshold and thereby determine coefficients of a second filter, in which the second filter response relates to a way of the second filter to process second data originated from the original data.

2. The method of claim 1, wherein the original data are image data, both the first data and the second data are data generated by a color filter array (CFA) circuit processing the original data.

3. The method of claim 2, wherein the first data include first pixel data of a specific color and the second data include second pixel data of the specific color.

4. The method of claim 3, wherein a data amount of the first pixel data of the specific color is less than a data amount of all pixel data of the specific color of the original data, and a data amount of the second pixel data of the specific color is less than the data amount of all the pixel data of the specific color of the original data.

5. The method of claim 3, wherein the first data do not include pixel data of the specific color of a first target pixel, and the first filter is configured to generate the pixel data of the specific color of the first target pixel according to the first data; the second data do not include pixel data of the specific color of a second target pixel, and the second filter is configured to generate the pixel data of the specific color of the second target pixel according to the second data.

6. The method of claim 3, wherein the specific color is red or blue.

7. A method for determining filter coefficients, comprising:

obtaining coefficients of a target filter and thereby calculating a target filter response, in which the target filter response relates to a way of the target filter to process original data; and computing according to collected data and/or predetermined data in accordance with a type of a front-end filter and thereby having a difference between a designed filter response and the target filter response be less than a threshold so as to determine coefficients of a designed filter, in which the designed filter response relates to a way of the designed filter to process filtered data originated from the front-end filter processing the original data.

8. The method of claim 7, wherein the original data are image data.

9. The method of claim 8, wherein the filtered data include pixel data of a specific color, the filtered data do not include pixel data of the specific color of a target pixel, and the designed filter is configured to generate the pixel data of the specific color of the target pixel according to the filtered data.

10. The method of claim 9, wherein the front-end filter is a color filter array (CFA) circuit.

11. The method of claim 9, wherein the specific color is red, green, or blue.

12. The method of claim 9, wherein a data amount of the pixel data of the specific color of the filtered data is less than a data amount of all pixel data of the specific color of the original data.

* * * * *